(12) United States Patent
Ogrin et al.

(10) Patent No.: US 10,370,017 B1
(45) Date of Patent: Aug. 6, 2019

(54) FRAME ADJUSTABLE ALL-TERRAIN STROLLER APPARATUS

(71) Applicants: Steven Ogrin, Roxborough, CO (US); Alyna Douglass, Roxborough, CO (US)

(72) Inventors: Steven Ogrin, Roxborough, CO (US); Alyna Douglass, Roxborough, CO (US)

( * ) Notice: Subject to any disclaimer, the term of this patent is extended or adjusted under 35 U.S.C. 154(b) by 0 days.

(21) Appl. No.: 15/975,605

(22) Filed: May 9, 2018

(51) Int. Cl.
| B62B 7/00 | (2006.01) |
| B62B 7/08 | (2006.01) |
| B62B 7/04 | (2006.01) |

(52) U.S. Cl.
CPC .............. B62B 7/08 (2013.01); B62B 7/044 (2013.01); *B62B 2205/06* (2013.01); *B62B 2301/20* (2013.01); *B62B 2301/254* (2013.01)

(58) Field of Classification Search
CPC .. B60B 7/062; B60B 7/08; B60B 7/06; B60B 7/044
See application file for complete search history.

(56) References Cited

U.S. PATENT DOCUMENTS

| 5,076,599 | A |   | 12/1991 | Lockett et al. |         |
|-----------|---|---|---------|----------------|---------|
| 5,123,670 | A |   | 6/1992  | Chen           |         |
| 5,158,319 | A |   | 10/1992 | Norcia et al.  |         |
| 5,188,389 | A |   | 2/1993  | Bachler et al. |         |
| 5,267,744 | A |   | 12/1993 | Berry et al.   |         |
| 5,299,825 | A | * | 4/1994  | Smith          | B62B 7/06 |
|           |   |   |         |                | 280/642 |
| 5,356,171 | A | * | 10/1994 | Schmidlin      | B62B 7/08 |
|           |   |   |         |                | 280/47.38 |
| 5,460,399 | A |   | 10/1995 | Baechler       |         |
| D370,438  | S |   | 5/1996  | Haut et al.    |         |
| 5,611,560 | A |   | 3/1997  | Thimmig        |         |
| D382,837  | S |   | 8/1997  | Haut et al.    |         |
| 5,683,096 | A |   | 11/1997 | Zonka          |         |
| 5,743,552 | A |   | 4/1998  | Baechler       |         |
| 5,884,920 | A |   | 3/1999  | Seto           |         |
| 5,887,889 | A |   | 3/1999  | Andrus         |         |
| 5,975,559 | A |   | 11/1999 | Zonka          |         |
| 6,042,129 | A |   | 3/2000  | Simpo          |         |
| 6,102,431 | A |   | 9/2000  | Sutherland et al. |       |
| 6,325,406 | B1 | * | 12/2001 | O'Shea         | B62B 7/06 |
|           |   |   |         |                | 280/62  |
| 6,443,467 | B1 |   | 9/2002  | Black          |         |
| 7,077,420 | B1 | * | 7/2006  | Santoski       | B62B 7/062 |
|           |   |   |         |                | 280/639 |

(Continued)

*Primary Examiner* — Hau V Phan
(74) *Attorney, Agent, or Firm* — Williams Intellectual Property; Benjamin F. Williams

(57) ABSTRACT

A frame adjustable all-terrain stroller apparatus for use along hiking and wilderness trails includes rear wheels attachable at lowermost ends of independently positionable swing arms. Each swing arm is securable independently and each rear wheel is thereby positionable at a different elevation enabling stable operation of the stroller apparatus along sloped surfaces. Each rear wheel includes a stub axle devised to engage interior to an aperture disposed at the lowermost end of each of the pair of swing arms. The rear wheels are securable in each of a first position, exteriorly mounted to the swing arms, and a second position, interiorly mounted to the swing arms, whereby the rear wheel track of the stroller apparatus is variable. No rear axle connecting between the rear wheels is required, so clearance of the stroller apparatus is maintained.

15 Claims, 10 Drawing Sheets

(56) References Cited

U.S. PATENT DOCUMENTS

| | | |
|---|---|---|
| 8,087,689 B2 | 1/2012 | Fritz et al. |
| 8,226,111 B2 | 7/2012 | Valdez et al. |
| 9,481,389 B2 | 11/2016 | Leys et al. |
| 2012/0242050 A1 | 9/2012 | Schroerder et al. |
| 2015/0353116 A1 | 12/2015 | Leys et al. |

\* cited by examiner

FRAME ADJUSTABLE ALL-TERRAIN STROLLER APPARATUS

BACKGROUND OF THE INVENTION

Various types of strollers are known in the prior art. Most are devised for use on smooth ground surfaces such as sidewalks and roadways, for example. Some all-terrain strollers exist, typically employing larger wheels, a longer wheel base, and larger tires. However, nearly all make use of a rear axle that unites the rear wheels and prevents adjustability of the rear wheel track. Thus all-terrain strollers seen in the art may present issues when navigating narrow trails, as frequented in the wilderness. The rear wheel track may be too large to be accommodated along a footpath, resulting in instability and discomfort for a child ported by the stroller as the rear wheels may be forced over more uneven terrain than that compacted by the frequent foot traffic.

A rear axle also reduces the clearance of the stroller. Since strollers require a low center of gravity to safely operate against the potential for tipping, stroller wheels are usually set fairly low to the ground. Thus a rear axle disposed uniting the rear wheels necessarily restricts the clearance of the stroller. This is problematic on off-road trails and especially hiking trails, where stones and rocks may regularly impede carriage thereover requiring a user to lift the stroller over and around objects which, were a higher clearance employed, would pose no impediment to travel.

Further, employment of a rear wheel axle uniting the rear wheels prevents independent elevation of either rear wheel, but maintains both linked together at the same relative height. Thus use of these fixed-wheel strollers along sloped surfaces can be tiresome (the person pushing the stroller must necessarily resist the stroller tipping and continually adjust the stroller along the ground surface against the action of gravity tending to turn the stroller downhill). Parking such a stroller on a sloped surface can be additionally problematic as the stroller is more likely to tip down slope or start off downhill, by itself.

The present frame adjustable all-terrain stroller apparatus solves these and other problems by presenting a pair of rear wheels which are independently attachable to either side of a lowermost end of each of a pair of swing arms. Each rear wheel is attachable in a first position, mounted exteriorly upon the lowermost end of an associated swing arm, and also in a second position, mounted interiorly upon the lowermost end of the associated swing arm. Thus the rear wheel track is adjustable between a maximum rear wheel track and a minimum rear wheel track. Further, each of the pair of swing arms is securable at independent elevations relative one another whereby the present frame adjustable all-terrain stroller apparatus is wieldable along sloped surfaces while maintaining a level carriage for a user seated and ported upon the stroller.

FIELD OF THE INVENTION

The present invention relates to a frame adjustable all-terrain stroller apparatus, and more particularly, to a frame adjustable all-terrain stroller apparatus devised for use along hiking and wilderness trails. In an example embodiment herein disclosed, the present frame adjustable all-terrain stroller apparatus includes three sixteen inch (16") wheels that are two inches (2") wide along inflatable, gripped tires. A pair of rear wheels is independently attachable to lowermost ends of a pair of swing arms. No rear axle is employed to link the rear wheels together, whereby clearance of the present frame adjustable all-terrain stroller apparatus is maintained above any clearance as would otherwise exist were a rear axle employed, and each rear wheel is independently attachable between a first position—mounted exteriorly upon the lowermost end of an associated swing arm—and a second position—mounted interiorly upon the lowermost end of an associated swing arm—wherein the rear wheel track is adjustable between a maximum rear wheel track (for greater stability and everyday use) and a minimum rear wheel track (for use along narrow hiking trails).

Further, each of the pair of swing arms is securable at independent elevations relative to the other of the pair of swing arms, whereby each of the pair of rear wheels may be independently raised relative the other to render carriage more appropriate for use along, and parking upon, a sloped surface.

SUMMARY OF THE INVENTION

The instant frame adjustable all-terrain stroller apparatus has been devised to enable portage of children along hiking and wilderness trails where other strollers, as seen in the art, would present challenges in stability, rigidity, clearance, carriage, and operation over persistent sloped surfaces and narrowed hiking and wilderness trails. The present frame adjustable all-terrain stroller apparatus has been devised to obviate need of a rear wheel axle, which axle necessarily restricts clearance to the height at which the axle is disposed, while maintaining a low center of gravity preferable for stability. The present frame adjustable all-terrain stroller apparatus enables reposition of each of a pair of rear wheels between a first position and a second position to adjust the rear wheel track and accommodate carriage and passage of the present frame adjustable all-terrain stroller apparatus along narrow trails. The frame adjustable all-terrain stroller apparatus is foldable into a folded position for portage and storage and is readily deployable for use when desired.

The present frame adjustable all-terrain stroller apparatus, therefore, includes a rectilinear frame member to which a seating member is mounted. The rectilinear frame member includes a first frame member foldably attached to a second frame member, as will be described subsequently.

The first frame member includes an uppermost horizontal section. A handlebars, to assist in manually grasping and directing the stroller apparatus, is disposed upon the uppermost horizontal section. A pair of side sections is disposed in parallel, downwardly projected from ends of the uppermost horizontal section. Each of the pair of side sections terminates interior to a folding bracket.

The second frame member includes a pair of side sections projected in parallel downwardly and deviated through a pair of inward bends that position a pair of closely spaced end sections in parallel to comprise a front fork wherein a front wheel is rotatably disposed. Each of the second frame member side sections originates endwise from securement interior an associated foldable bracket whereby the second frame member and the first frame member are secured together at a midpoint engaged interior to the folding brackets.

The folding brackets enable movement of the first frame member relative to the second frame member whereby the first frame member is moveable from an extended position to a folded position and compacted portage and storage of the stroller apparatus is enabled when not in use.

The rectilinear frame member is pivotally attached to each of a pair of swing arms. Each of the pair of swing arms is attached endwise to a respective one of the pair of side sections of the second frame member. Each of the pair of swing arms includes a horizontal section projected rearwardly and thence deflected through each of a first bend and a second bend to present a lowermost section disposed perpendicularly relative to the corresponding horizontal section. A lowermost end terminates the lowermost section of each of the pair of swing arms.

Each of a pair or rear wheels is independently securable to the lowermost end of each of the pair of swing arms. Each of the pair of rear wheels includes a stub axle projected perpendicularly from a central hub portion of the corresponding rear wheel, said stub axle devised to secure interior to an aperture disposed at the lowermost end of each of the pair of swing arms. The stub axle is devised to have a length sufficient for engagement interior to the aperture, but short enough not to protrude significantly out the aperture on the other side of the lowermost end. Thus clearance of the present stroller apparatus is maintained between each of the rear wheels since no rear axle transversely connects the rear wheels together; rather unobstructed carriage is maintained underneath the rectilinear frame and an underlying ground surface between the rear wheels.

Each of the pair of rear wheels is connectable to the lowermost end of either one of the pair of swing arms from either opposing direction, enabling mounting of the wheels in both of a first position, exteriorly situated upon the lowermost end, and a second position, interiorly situated upon the lowermost end. The track of the rear wheels is thereby adjustable between a maximum track, when the wheels are disposed in the first position, and a minimum track, when the wheels are disposed in the second position. Use of the present frame adjustable all-terrain stroller apparatus along narrow trails is thereby afforded and a narrowed passage is ensured when each of the rear wheels is disposed in the second position. Clearance of the stroller apparatus is nonetheless maintained over each rear wheel track.

The frame adjustable all-terrain stroller apparatus further accommodates use along mountain and hiking trails by enabling independent elevation of each of the rear wheels by use of a pivot joint disposed to connect each swing arm to a shock absorbing member, which shock absorbing member compressibly connects each swing arm to each side section of the first frame member. Each pivot joint enables movement of the corresponding swing arm between at least a first position and a second position whereby the associated rear wheel is raised or lowered respectively. Each pivot joint is operable in conjunction with a corresponding one of a pair of securable members which enable selective position and securement of each of the pair of pivot joints when an engaging pin is selectively engaged.

Thus the rear wheels are independently settable at different elevations relative to one another whereby the rear wheel track is enabled angularly to maintain level carriage of the seating member along sloped surfaces. This is especially useful when parking the stroller on a sloped surface, for example, as the angularly arranged wheels and level seating member thereby lessen any chance of tipping by a child seated therein.

Thus has been broadly outlined the more important features of the present frame adjustable all-terrain stroller apparatus so that the detailed description thereof that follows may be better understood and in order that the present contribution to the art may be better appreciated.

Objects of the present frame adjustable all-terrain stroller apparatus, along with various novel features that characterize the invention are particularly pointed out in the claims forming a part of this disclosure. For better understanding of the frame adjustable all-terrain stroller apparatus, its operating advantages and specific objects attained by its uses, please refer to the accompanying drawings and description.

BRIEF DESCRIPTION OF THE DRAWINGS

Figures

DETAILED DESCRIPTION OF THE DRAWINGS

Figure 1:
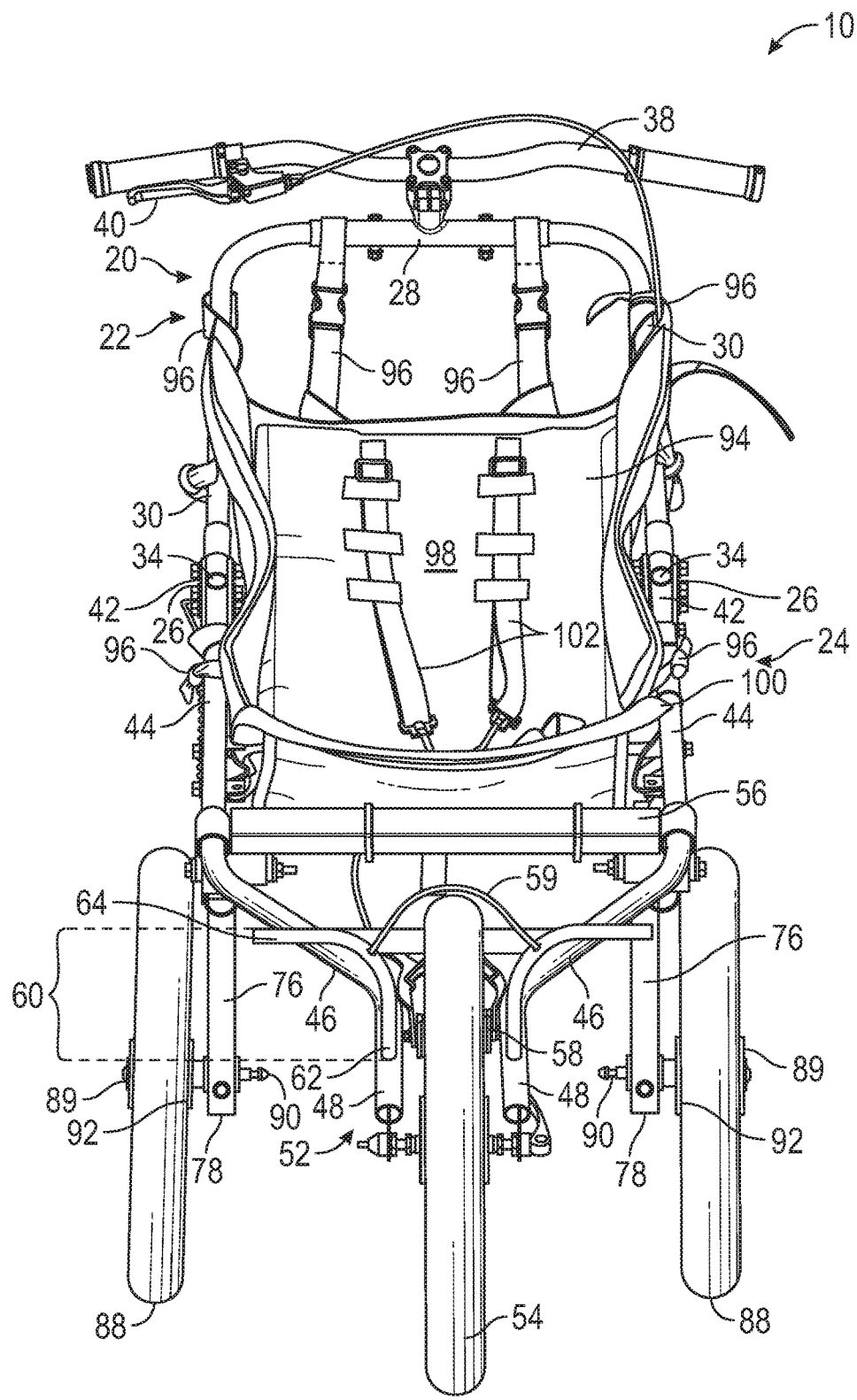
FIG. 1 is a front elevation view of an example embodiment of the present frame adjustable all-terrain stroller apparatus with a pair of rear wheels disposed is a first position on an exterior side of a pair of swing arms, said pair of rear wheels thereby occupying a maximum rear wheel track.
Figure 2:
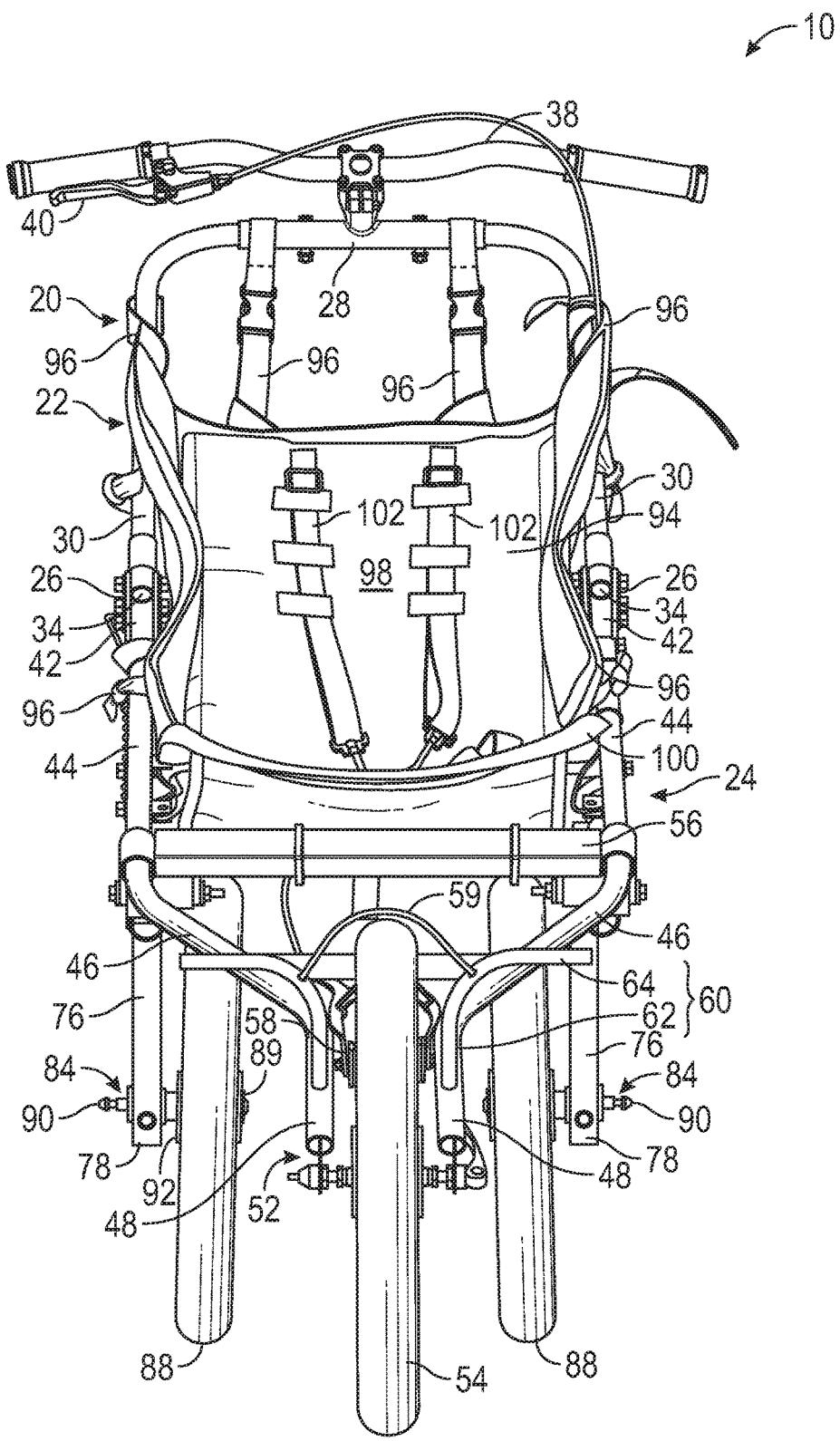
FIG. 2 is a front elevation view of an example embodiment with the pair of rear wheels disposed is a second position on an interior side of the pair of swing arms, said pair of rear wheels thereby occupying a minimum rear wheel track.
Figure 3:
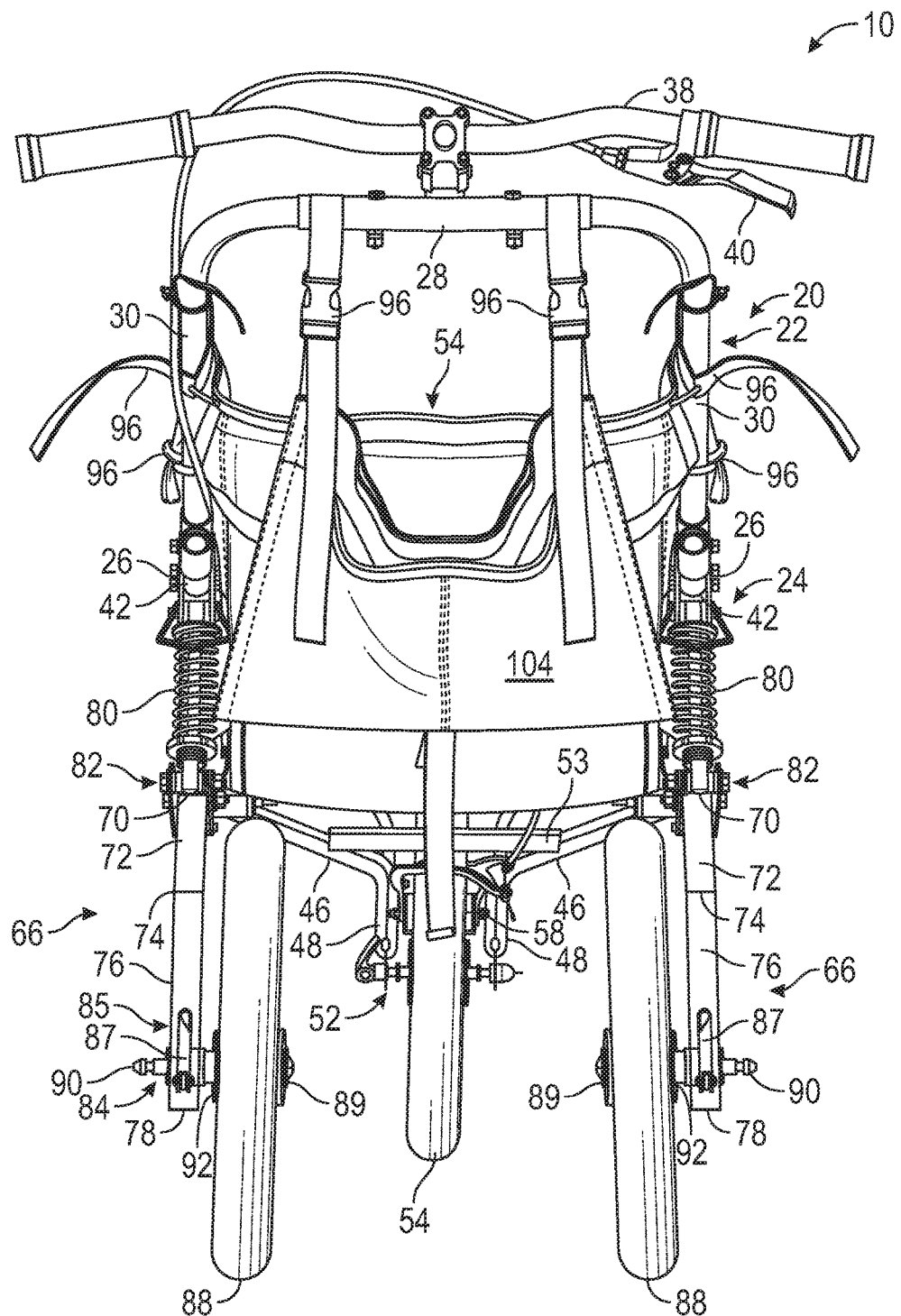
FIG. 3 is a rear elevation view of an example embodiment with the pair of rear wheels disposed is the second position on the interior side of the pair of swing arms, said pair of rear wheels thereby occupying a minimum rear wheel track.
Figure 4:
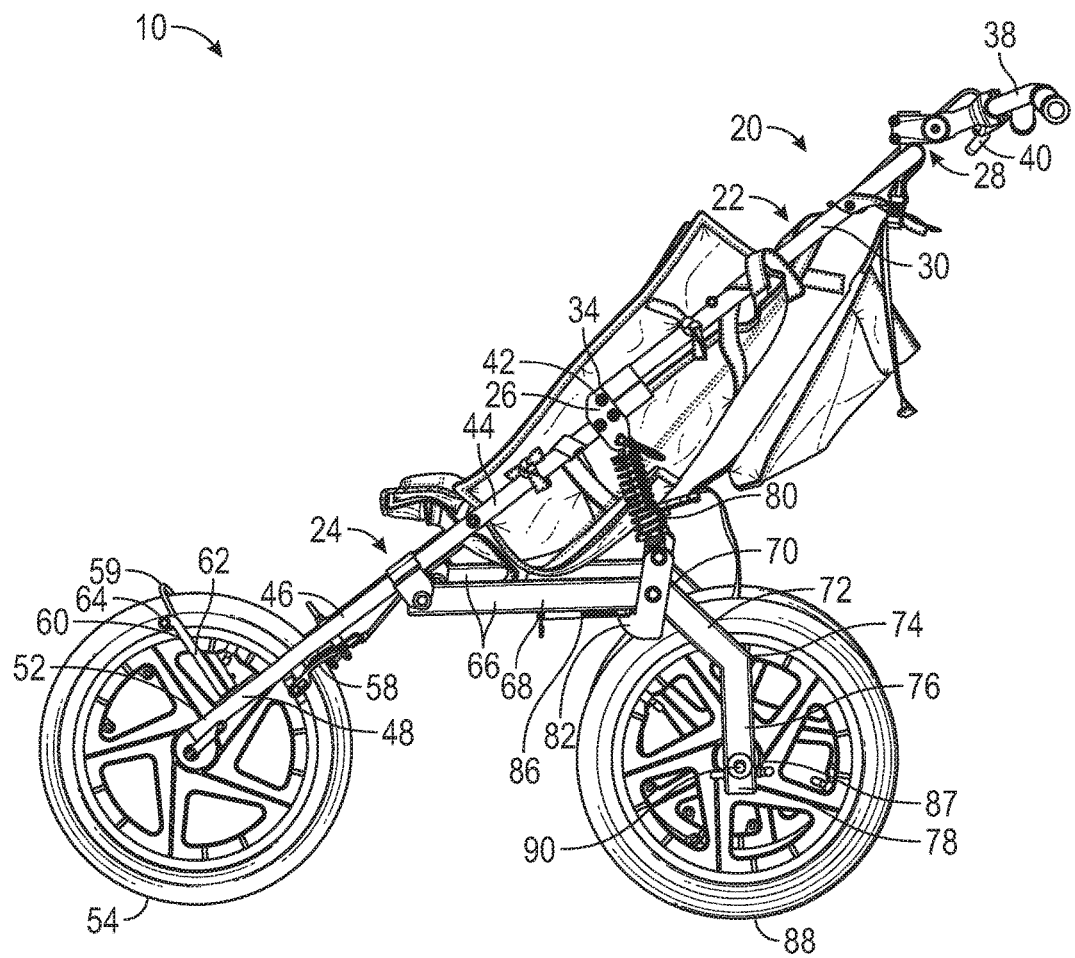
FIG. 4 is a left side elevation view of an example embodiment with the pair of rear wheels disposed in the second position on the interior side of the pair of swing arms, said pair of rear wheels thereby occupying a minimum rear wheel track.
Figure 5:
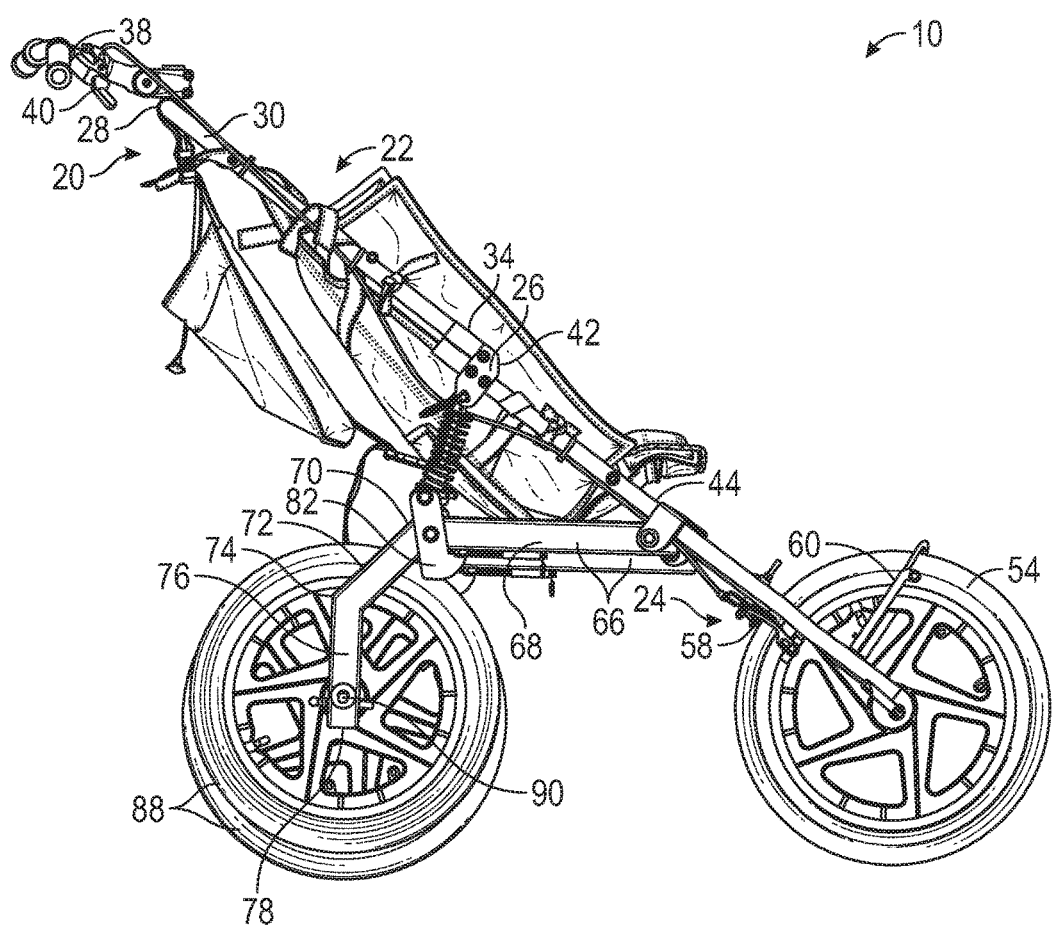
FIG. 5 is a right side elevation view of an example embodiment with the pair of rear wheels disposed in the second position on the interior side of the pair of swing arms, said pair of rear wheels thereby occupying a minimum rear wheel track.
Figure 6:
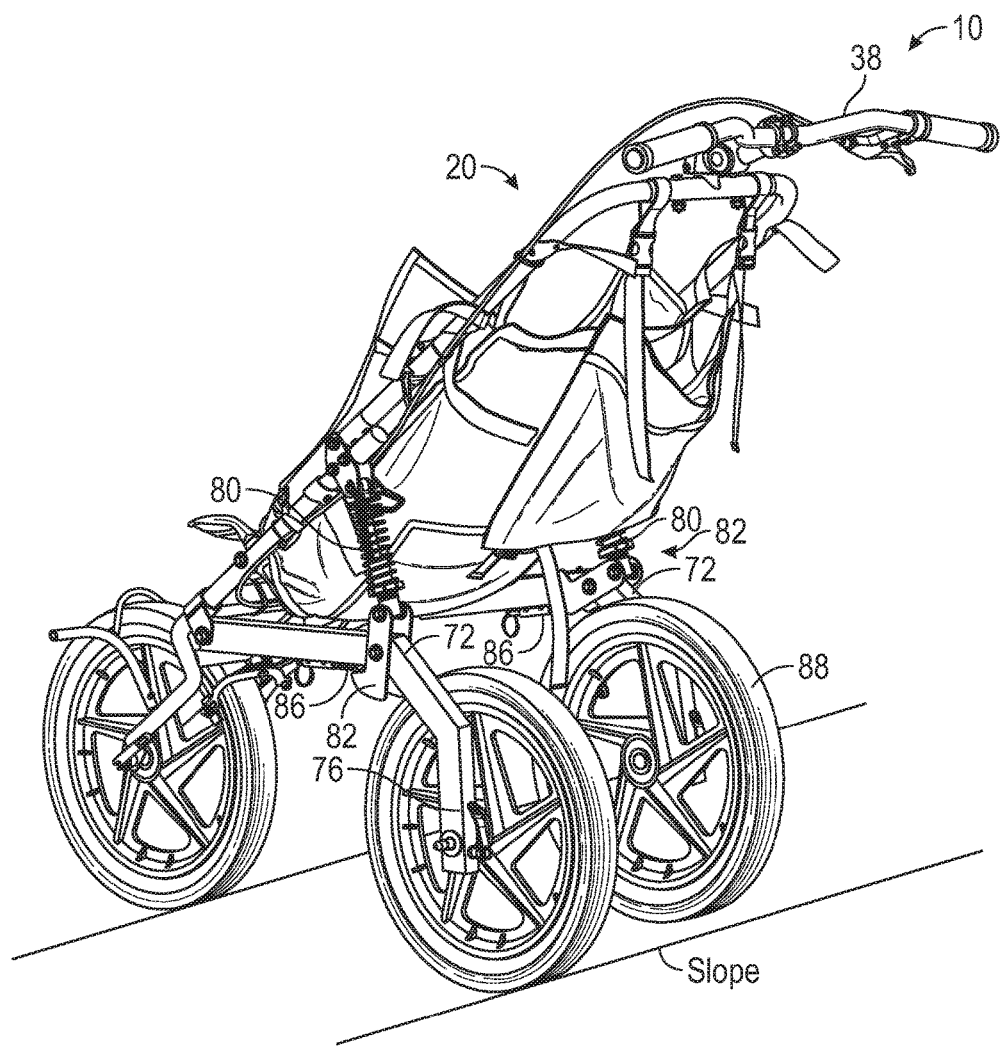
FIG. 6 is an isometric view of an example embodiment with the pair of wheels disposed in the second position and with one of said pair of rear wheels positioned at an elevation independent of the other of said pair of rear wheels whereby the stroller apparatus is maintained levelly along sloped surfaces.
Figure 7:
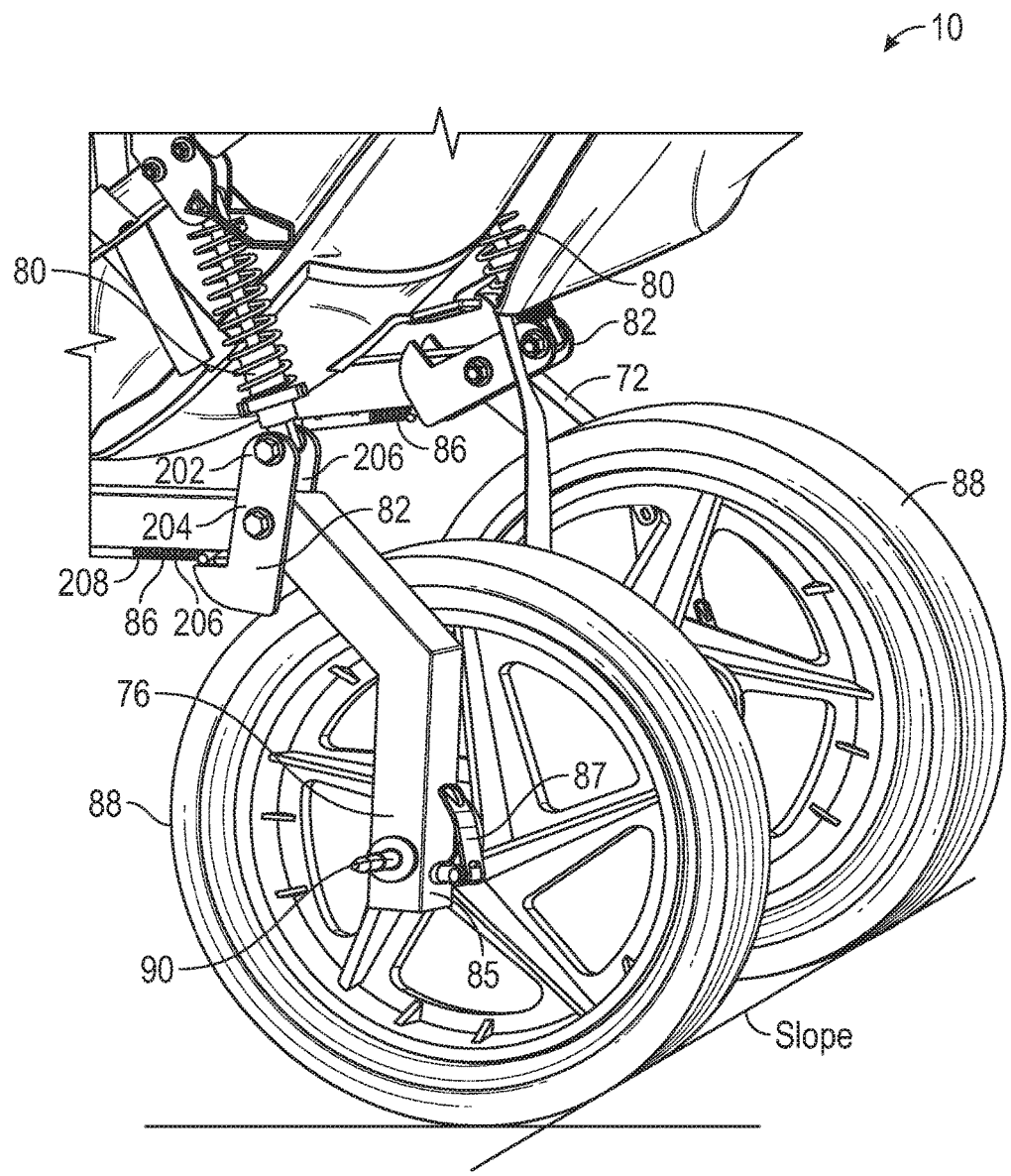
FIG. 7 is a detail view of an example embodiment of a pair of rear wheels, disposed in the second position, and each of the pair of swing arms illustrating the action of a pivot joint to orient one of the pair of swing arms at a different elevation relative the other of the pair of swing arms whereby one of the pair of rear wheels is disposed at an elevation independent the other of the pair of rear wheels whereby the stroller apparatus is maintained levelly along sloped surfaces.
Figure 8:
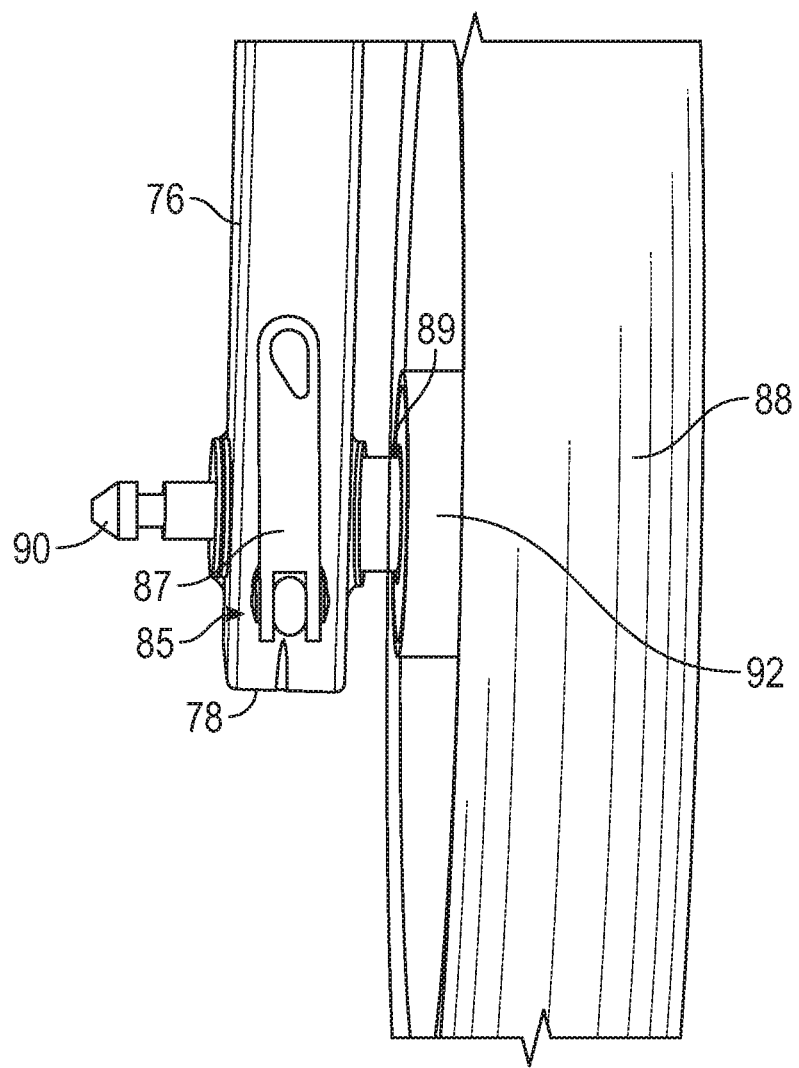
FIG. 8 is a detail view of an example embodiment of a lowermost end of one of the pair of swing arms illustrating one of the pair of rear wheels and an associated stub axle engaged by action of a quick release mechanism interior to an aperture wrought through the lowermost end, whereby the rear wheel is expediently detachable and repositioned on the other side of said lowermost end of the associated swing arm, whereby the rear wheel track is adjustable between a maximum wheel track (with the rear wheels in the first position) and a minimum rear wheel track (with the rear wheels in the second position).

With reference now to the drawings, and in particular FIGS. 1 through 10 thereof, example of the instant frame adjustable all-terrain stroller apparatus employing the principles and concepts of the present frame adjustable all-terrain stroller apparatus and generally designated by the reference number 10 will be described.

Referring to FIGS. 1 through 10 a preferred embodiment of the present frame adjustable all-terrain stroller apparatus 10 is illustrated.

A frame adjustable all-terrain stroller apparatus 10 includes a generally rectilinear frame member 20 pivotally attached to a pair of swing arms 66. The rectilinear frame member 20 includes a first frame member 22 and a second frame member 24 rotationally securable together at a midpoint 26 thereof.

Figure 9:
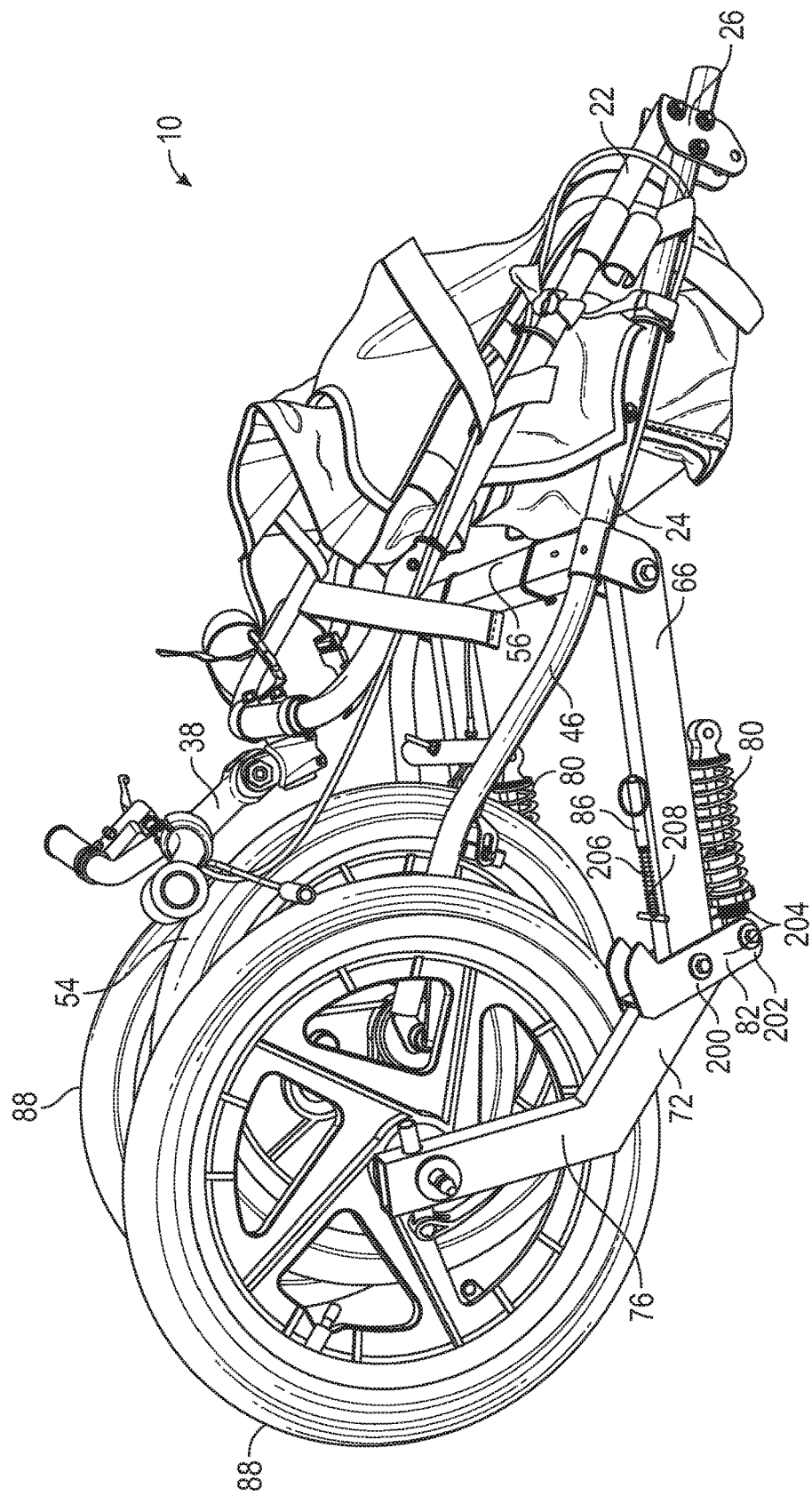
FIG. 9 is an elevation view of an example embodiment disposed in a folded position.
Figure 10:
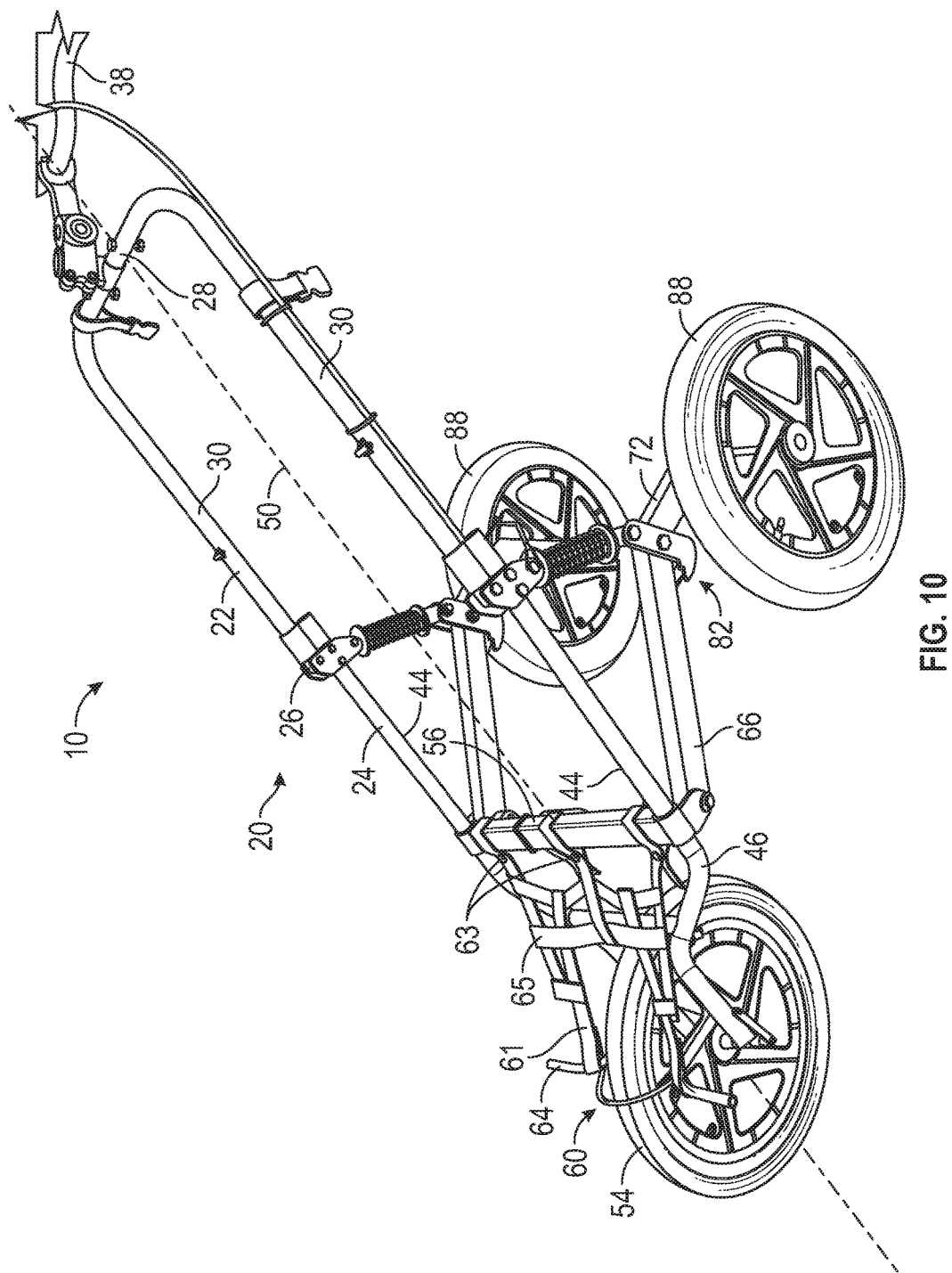
FIG. 10 is an elevation view of the frame adjustable all-terrain stroller apparatus without a seating member attached to a rectilinear frame member.

The first frame member 22 includes an uppermost horizontal section 28 and a pair of side sections 30 disposed parallel and projected downwardly from each of a pair of ends 34 of the uppermost horizontal section 28. To enable manual control of the stroller apparatus, a handlebars 38 with a brake handle 40 is disposed upwardly projected from the horizontal section 28 of the first frame member 22. Each of the pair of side sections 30 is seated endwise interior to a folding bracket 42, which folding bracket 42 is likewise connected to the second frame member 24. Thusly the first frame member 22 is secured to the second frame member 24 to comprise the rectilinear frame member 20. Each of the pair of folding brackets 42 selectively facilitates movement of the first frame member 22 through 180° to rest parallel and overlying the second frame member 24. Each of the pair of folding brackets 42 is securable whereby the rectilinear frame member 20 is securable between an extended position (as shown in FIGS. 1-6, for example) and a folded position (as shown in FIG. 9).

The second frame member 24 likewise includes a pair of side sections 44 disposed in parallel and endwise secured interior to each of the pair of folding brackets 42. Each of the pair of side sections 44 projects downwardly through an inward bend 46, each said inward bend 46 deflecting the corresponding side section 44 toward a longitudinal medial axis 50 bisecting the rectilinear frame member 20. A pair of closely spaced end sections 48 is thereby disposed in parallel endwise upon the inward bend 46 of each of the pair of side sections 44, said pair of closely spaced end sections 48 thereby comprising a front fork 52 interior to which a front wheel 54 is rotatably housed. A span member 53 is disposed horizontally securing each inward bend together rearwards of the front wheel 54 and provides a position to mount a brake member 58, disposed in operational communication with the brake handle 40, to selectively arrest rotation of the front wheel 54 when the brake handle 40 is manually engaged.

A horizontal crossbar 56 is disposed between each of the pair of side sections 44 of the second frame member 24, proximal the pair of inward bends 46. The horizontal crossbar 56 adds rigidity to the rectilinear frame member 20 and provides positions for attachment of a plurality of fasteners 63 for a webbing 65 optionally connectable thereto, as will be described subsequently (see FIG. 10 for example). The horizontal crossbar 56 further distributes weight and pressure exerted upon the rectilinear frame member 20 to each of a pair of swing arms 66, as will be described subsequently.

Each of a pair of footrests 60 is projected upwardly from each of the pair of closely spaced end sections 48. Each of said pair of footrests 60 is arcuately deflected from a vertical section 62 disposed normal the corresponding closely spaced section 48 to a radial section 64 disposed transversely normal the medial axis 50 bisecting the rectilinear frame member 20. An arched section 59 is disposed interconnecting each radial section 64 overtop of the front wheel 54. See for example FIGS. 1 and 2. Each of the pair of foot rests 60 may further operate to secure webbing 65 tautly disposed strung between the pair of foot rests 60 and the horizontal crossbar 56 whereby smaller children seated in the apparatus 10 are enabled to rest their feet thereon. Webbing 65 may be expediently installed to and removed from use upon the apparatus 10 by action of a plurality of fasteners 63 disposed to securably engage ends of the webbing 65 around the horizontal crossbar 56 and each of a pair of loops 61 securable upon each radial section 64 of the pair of footrests 60.

Each of the pair of swing arms 66 is disposed pivotally attached endwise to the second frame member 24 in a position proximal a corresponding end of the horizontal crossbar 56. Each of said pair of swing arms 66 includes a horizontal section 68, a first bend 70 deflected angularly downwards relative the horizontal section 68, an angled section 72 disposed deflected angularly downwards from the horizontal section 68 at the first bend 70, a second bend 74 disposed endwise upon angled section 72, and a lowermost section 76 disposed endwise upon the second bend 74 and projected perpendicularly downwards relative the horizontal section 68. A lowermost end 78 is disposed terminally upon the lowermost section 76. Each of a pair of compressible shock absorbing members 80 is also disposed connecting between the first frame member 22 and each of the pair of swing arms 66 at each of the pair of folding brackets 42. Each of said pair of compressible shock absorbing members 80 is pivotally and securably connected to a corresponding one of the pair of swing arms 66 proximal the first bend 70 by action of a corresponding pivot joint 82.

Each of the pair of swing arms 66 is independently moveable through a range of positions relative the rectilinear frame member 20 by action of each associated pivot joint 82. To selectively secure the pivot joint 82 in a desired position, each of a pair of securable members 86 is disposed in operational communication with each of the pair of pivot joints 82. Each of the pair of securable members 86 is positionable to enable pivoting of the corresponding pivot joint 82 and alternately disable pivoting of said corresponding pivot joint 82, wherein each of the pair of pivot joints 82 is securable between at least a first position and a second position whereby each of the pair of swing arms 66 is independently securable across a range of angular positions disposed relative the rectilinear frame member 20. Thus a user is enabled to position each of the pair of swing arms 66 for use of the stroller apparatus 10 along sloped surfaces, as will be described subsequently.

In the example embodiment illustrated herewith, each pivot joint 82 includes a bracket member 200 having an upper end 202 pivotally connected to a corresponding one of the pair of shock absorbing members 80. A mid-portion 204 of the bracket member 200 is pivotally connected to a corresponding one of the pair of swing arms 66 in a position proximal the first bend 70. See for example FIG. 5. Each of the pair of securable members 86 is disposed upon an underside of the horizontal section 68 of the corresponding swing arm 66 and is devised to maintain position of an engaging pin 206 to secure the corresponding bracket member 200 at a set declination relative the horizontal section 68 of the swing arm 66. The engaging pin 206 may be set against the action of a spring member 208 to maintain position engaging the bracket member 200 at the desired declination and to enable selective release of the engaging pin 206 from said engagement when a user pulls back upon the engaging pin 206 against the action of the spring member 208. Thus the bracket member 200 of each of the pair of pivot joints 82 is settable between a range of positions in angled relation relative to the horizontal section 68 of the corresponding swing arm 66. See for example FIGS. 6 and 7. Position of the pivot joint 82 thereby adjusts the elevation of the lowermost end of the associated swing arm 66 whereby one of a pair of rear wheels 88 there disposed is securable in independent elevated position relative the other of said pair of rear wheels 88, as will be described subsequently.

An aperture 84 is disposed transversely through the lowermost end 78 of each swing arm 66 and a quick-release mechanism 85 is disposed for engagement interior to the aperture 82. A pair of rear wheels 88 is disposed at the lowermost end 78 of each of the pair of swing arms 66. Each of said pair of rear wheels 88 includes a stub axle 90 projected from a central hub portion 92 of each said rear wheel 88, said stub axle 90 devised for securable interconnection interiorly engaged within the aperture 84 disposed at the lowermost end 78 of each of the pair of swing arms 66. The stub axle 90 is connectable through the aperture 84 in each of a first direction and also a second direction, whereby the corresponding rear wheel 88 is selectively positionable on either side of the lowermost end 78 of the corresponding swing arm 66. A rotatable bearing 89 disposed at the central hub portion 92 of each said rear wheel 88 enables rotation of the associated rear wheel 88 upon the stub axle 90. In the example embodiment herein depicted, to accommodate rough and uneven terrain as frequently encountered when traveling off-road, the front wheel 54 and rear wheels 88 of the present apparatus 10 have a 16" diameter and are approximately 2" wide.

Each of the pair of rear wheels 88, rotatably engaged endwise at the lowermost end 78 of each of the pair of swing arms 66, is thereby positionable by action of the bracket member 200 of each associated pivot joint 82. Therefore each of the pair of rear wheels 88 may be secured at different elevations relative one another whereby the frame adjustable all-terrain stroller apparatus 10 is drivable along a sloped surface while maintaining the rectilinear frame member 20 in a position alike use upon a level surface. Further, by setting the relevant position of each of the pair of swing arms 66 whereby each rear wheel 88 is positioned at a different elevation relative one another, the stroller apparatus 10 is parkable upon a sloped surface wherein the possibility of overturning downslope is considerably lessened thereby.

A quick-release mechanism 85 is disposed in operative communication with each aperture 84 at the lowermost end 78 of each of the pair of swing arms 66, said quick-release mechanism 85 disposed to selectively engage the stub axle 90 of an associated wheel 88 when inserted into the aperture 84 and a quick-release handle member 87 is subsequently moved from a first position to a second position; said quick release mechanism 85 disposed to also release said stub axle 90 when said quick-release handle member 87 is moved from the second position to the first position. Thus each of the pair of rear wheels 88 is rapidly detachable and reattachable on either side of an associated lowermost end 78 of the corresponding one of the pair of swing arms 66. The track of the pair of rear wheels 88 is thereby reducible when said wheels 88 are moved from a first position, exteriorly mounted to lowermost ends 78 of the pair of swing arms 66, to a second position interiorly mounted to the lowermost ends 78 of the pair of swing arms 66. See FIGS. 1 and 2 for example. The frame adjustable all-terrain stroller apparatus 10 is thereby configurable for use on narrow hiking trails while maintaining high ground clearance despite the reduced rear wheel track.

A seating member 94 is suspendable from the rectilinear frame member 20. The seating member 94 includes a plurality of attachment members 96 disposed for attachment to the rectilinear frame member 20 on all sides of the seating member 94. A rear portion 98 is disposed to support a back of a user disposed seated within the seating member 94. A seating portion 100 is disposed angularly relative the rear portion 98, said seating portion 100 disposed to support a user seated upon said seating portion 100. In the example embodiment depicted herein, the seating member 94 is rendered of fabric and therefore malleable and collapsible when the rectilinear frame member 20 is folded into the folded position. The seating member 94 may also include a harness 102 to secure a child thereto.

A carry sack 104 is disposed attachable to the rectilinear frame member 20 on the rear side of the seating member 94 whereby a user can port various accouterments as desired. The carry sack 104 may be devised to integrate into the plurality of attachment members 96 that enable securement of the seating member 94 to the rectilinear frame member 20. Further modularization of additional accouterments rendered attachable to the rectilinear frame member is contemplated as part of this invention including, for example, attachable cup holders, baskets, flags, holsters, shelves, pockets, racks and other such attachable components useful for porting various objects and articles when hiking along mountain and wilderness trails.

What is claimed is:

1. A frame adjustable all-terrain stroller apparatus comprising each of a pair of rear wheels disposed securable to a lowermost end of each of a pair of swing arms, each of said pair of rear wheels having a stub axle disposed perpendicularly protruding from a central hub portion thereof, said stub axle disposed to protrude to a length capable of securement interior to a corresponding aperture disposed at the lowermost end of each of said pair of swing arms without said stub axle protruding beyond a distance that maintains clearance of the stroller, wherein each of the pair of rear wheels is independently removable from a first position, disposed upon an exterior side upon each swing arm, and rapidly securable in a second position, disposed on an interior side of each swing arm, whereby a track of the rear wheels is variable between a minimum width and a maximum width and clearance of the stroller over uneven terrain is maintained even on narrow hiking trails.

2. The frame adjustable all-terrain stroller apparatus of claim 1 wherein each of the pair of swing arms further comprises a corresponding one of a pair of securable members disposed in operational communication with a corresponding one of a pair of pivot joints, each of said pair of securable members positionable to enable pivoting of the corresponding pivot joint and alternately disable pivoting of said corresponding pivot joint wherein each of the pair of pivot joints is securable between at least a first position and a second position whereby each of the pair of swing arms is independently securable across a range of angular positions disposed relative to each other wherein the track of the rear wheels is securable angularly to maintain level carriage of the stroller upon sloped surfaces.

3. The frame adjustable all-terrain stroller apparatus of claim 2 further comprising a rectilinear frame member, said rectilinear frame member comprising:
  a first frame member having:
    an uppermost horizontal section;
    a pair of side sections disposed downwardly projected in parallel from opposing ends of the uppermost horizontal section, each of said pair of side sections terminating within a corresponding folding bracket;
    a handlebars attached to the uppermost horizontal section;
  a second frame member having:
    each of a pair of side sections disposed downwardly projected in parallel from each of the pair of folding brackets, each of said pair of side sections having;
      an inward bend disposed deflecting each of the pair of side sections towards one another;
    a pair of closely spaced end sections disposed in parallel to comprise a front fork;
    a horizontal crossbar disposed transversely connecting each side section proximal each inward bend; and
    a front wheel rotatably hosed at the front fork;
  wherein the first frame is selectively securable between an extended position, extending through a like plane relative to the second frame member, and a folded position, overlying and parallel the second frame member.

4. The frame adjustable all-terrain stroller apparatus of claim 3 wherein the second frame member further comprises a pair of footrests disposed upon the pair of closely spaced end sections, each of said pair of footrests comprising:
  a vertical section disposed projected perpendicularly from a corresponding one of the closely spaced end sections;
  a radial section disposed transversely perpendicular to the corresponding vertical section; and
  an arched portion interconnecting each radial portion overtop of the front wheel.

5. The frame adjustable all-terrain stroller apparatus of claim 4 wherein a webbing selectively attaches between the pair of footrests and the horizontal crossbar of the second frame member, said webbing comprising:
  a pair of loops devised to slip over the radial section of each of the pair of foot rests; and
  a plurality of fasteners devised to secure the webbing to the horizontal crossbar.

6. The frame adjustable all-terrain stroller apparatus of claim 5 further comprising a seating member suspendable from the rectilinear frame member, said seating portion comprising:
  a rear portion disposed to support the back of a user seated upon the seating member;
  a seating portion angularly disposed relative the rear portion, said seating portion disposed to support a user seated thereon; and
  a plurality of attachment members devised to attach the seating member to the first and second frame members;
  wherein the seating member is attachable to the rectilinear frame member to support a user therein.

7. The frame adjustable all-terrain stroller apparatus of claim 6 wherein the seating member is made of fabric.

8. A frame adjustable all-terrain stroller apparatus comprising:
  a rectilinear frame member having a front fork and a horizontal crossbar disposed proximal the front fork;
  a pair of swing arms, each of said pair of swing arms disposed pivotally attached endwise to the rectilinear frame member and rearwardly projected from a position proximal a corresponding end of the first horizontal crossbar, each of said pair of swing arms comprising:
    a horizontal section;
    a first bend deflected downwards;
    a lowermost end;
    an aperture disposed transversely through the lowermost end;
  a pair of compressible shock absorbing members disposed pivotally connected between the rectilinear frame member and each of the pair of swing arms, each of said pair of compressible shock absorbing members pivotally and securably connected to a corresponding one of the pair of swing arms proximal the first bend by action of a corresponding pivot joint;
  each of a pair of securable members disposed in operational communication with a corresponding one of the pair of pivot joints, each of said pair of securable members positionable to enable pivoting of the corresponding pivot joint and alternately disable pivoting of said corresponding pivot joint, wherein each of the pair of pivot joints is securable between at least a first position and a second position whereby each of the pair of swing arms is independently securable across a range of angular positions disposed relative to the rectilinear frame member;
  a pair of rear wheels disposed positionable at the lowermost end of each of the pair of swing arms, each of said pair of wheels having:
    a stub axle projected from a central hub portion, said stub axle devised for securable interconnection interiorly engaged within the aperture disposed at the lowermost end of each of the pair of swing arms, said stub axle connectable through the aperture in each of a first direction and also a second direction whereby the corresponding rear wheel is positionable on either side of the lowermost end of the corresponding swing arm;
    a rotatable bearing at the central hub portion;
  a quick-release mechanism disposed in operative communication with each aperture and disposed to selectively engage the stub axle of an associated rear wheel when said stub axle is inserted into the aperture and a quick-release handle member is moved from a first position to a second position; and
  a seating member suspendable from the first frame member;
  wherein a rear track of the rear wheels is variable between a maximum rear track, with the rear wheels disposed exteriorly upon the swing arms, and a minimum rear track, with the rear wheels disposed interiorly upon the swing arms, and high clearance of the stroller is maintained, whereby each of the swing arms is independently securable at differing elevations relative one another and the frame adjustable all-terrain stroller apparatus is therefore usable along narrow, rocky, and sloped trails.

9. The frame adjustable all-terrain stroller apparatus of claim 8 wherein the rectilinear frame member further comprises:
  a first frame member having:
    an uppermost horizontal section;
    a pair of side sections disposed downwardly projected in parallel from opposing ends of the uppermost horizontal section, each of said pair of side sections terminating within a corresponding folding bracket;
a handlebars attached to the uppermost horizontal section;
a second frame member having:
each of a pair of side sections disposed downwardly projected in parallel from each of the pair of folding brackets, each of said pair of side sections having;
an inward bend disposed deflecting each of the pair of side sections towards one another;
a pair of closely spaced end sections disposed in parallel to comprise the front fork;
a horizontal crossbar disposed transversely connecting each side section proximal each inward bend; and
a front wheel rotatably hosed at the front fork;
wherein the first frame is selectively securable between an extended position, extending through a like plane relative to the second frame member, and a folded position overlying and parallel the second frame member.

10. The frame adjustable all-terrain stroller apparatus of claim 9 wherein the second frame member further comprises a pair of footrests disposed upon the pair of closely spaced end sections, each of said pair of footrests comprising:
a vertical section disposed projected perpendicularly from a corresponding one of the closely spaced end sections;
a radial section disposed transversely perpendicular to the corresponding vertical section; and
an arched portion interconnecting each radial portion overtop of the front wheel.

11. The frame adjustable all-terrain stroller apparatus of claim 10 wherein a webbing selectively attaches between the pair of footrests and the horizontal crossbar of the second frame member, said webbing comprising:
a pair of loops devised to slip over the radial section of each of the pair of foot rests; and
a plurality of fasteners devised to secure the webbing to the horizontal crossbar.

12. The frame adjustable all-terrain stroller apparatus of claim 11 further comprising a seating member suspendable from the rectilinear frame member, said seating portion comprising:
a rear portion disposed to support the back of a user seated upon the seating member;
a seating portion angularly disposed relative the rear portion, said seating portion disposed to support a user seated thereon; and
a plurality of attachment members devised to attach the seating member to the first and second frame members;
wherein the seating member is attachable to the rectilinear frame member to support a user therein.

13. The frame adjustable all-terrain stroller apparatus of claim 12 wherein the seating member is made of fabric.

14. The frame adjustable all-terrain stroller apparatus of claim 13 further comprising a carry sack attachable to the rectilinear frame member rearwardly behind the seating member.

15. A frame adjustable all-terrain stroller apparatus comprising:
a generally rectilinear frame member having:
a first frame member having:
an uppermost horizontal section;
a handlebars disposed upwardly projected from the uppermost horizontal section of the first frame member;
a brake handle disposed to prevent rotation of the front wheel when a handle upon the handlebars is manually engaged;
a pair of side sections disposed projected downwardly from opposing ends of the uppermost horizontal section, each of said pair of side sections terminating endwise secure interior to a folding bracket;
a second frame member having:
each of a pair of side sections disposed projected downwardly from each corresponding folding bracket;
an inward bend disposed endwise upon each of the pair of side sections, said inward bend deflecting the corresponding side section toward a longitudinal medial axis bisecting the first frame member;
a pair of closely spaced end sections disposed in parallel endwise upon each of the pair of inward bends, said pair of closely spaced end sections comprising a front fork;
a horizontal crossbar disposed between each of the pair of side sections proximal the pair of inward bends;
each of a pair of footrests projected upwardly from each of the pair of closely spaced end sections, each of said pair of footrests having a vertical section and a radial section disposed transversely normal the medial axis;
a front wheel rotatably disposed interconnecting the pair of closely spaced end sections;
a brake member disposed operatively controlled by the brake handle, said brake member thereby manually actionable to prevent rotation of the front wheel;
a webbing devised for attachment to the second frame member between the pair of foot rests and the horizontal crossbar, said webbing comprising:
a pair of loops devised to slip over the radial section of each of the pair of foot rests;
a plurality of fasteners devised to secure the webbing to the horizontal crossbar;
a pair of swing arms, each of said pair of swing arms disposed pivotally attached endwise to the second frame member in a position proximal a corresponding end of the horizontal crossbar, each of said pair of swing arms comprising:
a horizontal section;
a first bend deflected angularly downwards relative the horizontal section;
an angled section disposed deflected angularly downwards from the horizontal section at the first bend;
a second bend disposed endwise upon angled section, said second bend orienting a lowermost section perpendicularly downwards relative the horizontal section;
a lowermost end disposed terminating the lowermost section;
an aperture disposed transversely through the lowermost end;
a quick-release mechanism disposed for engagement interior to the aperture;
a pair of compressible shock absorbing members disposed connected between each folding bracket and each of the pair of swing arms, each of said pair of compressible shock absorbing members pivotally and securably connected to a corresponding one of the pair of swing arms proximal the first bend by action of a corresponding pivot joint, said pivot joint comprising:
a bracket member having an upper end pivotally connected to a corresponding one of the pair of shock absorbing members;

a mid-portion pivotally connected to a corresponding one of the pair of swing arms;

each of a pair of securable members disposed in operational communication with a corresponding one of the pair of pivot joints, each of said pair of securable members positionable to enable pivoting of the corresponding pivot joint and alternately disable pivoting of said corresponding pivot joint wherein each of the pair of pivot joints is securable between at least a first position and a second position whereby each of the pair of swing arms is independently securable across a range of angular positions disposed relative to the rectilinear frame member and each lowermost end is positionable at a differing elevation relative to the other lowermost end;

a pair of rear wheels disposed positionable at the lowermost end of each of the pair of swing arms, each of said pair of wheels having:

a stub axle projected from a central hub portion, said stub axle devised for securable interconnection interiorly engaged by the quick release mechanism within the aperture disposed at the lowermost end of each of the pair of swing arms, said stub axle connectable through the aperture in each of a first direction and a second direction whereby the corresponding rear wheel is positionable on either side of the lowermost end of the corresponding swing arm and securable thereat by action of the quick release mechanism;

a rotatable bearing disposed at the central hub portion;

a fabric seating member suspendable from the first frame member, said seating member including:

a plurality of attachment members disposed for attachment to the first frame member on all sides of the seating member;

a rear portion disposed to support a back of a user disposed seated within the seat member;

a seating portion disposed angularly relative the rear portion, said seating portion disposed to support a user disposed seated upon the seating portion; and a fabric carry sack attachable to the rectilinear frame member rearwards of the seating member, said carry sack devised for porting accouterments therein;

wherein a rear track of the rear wheels is variable between a maximum rear track, with the rear wheels disposed exteriorly upon the swing arms, and a minimum rear track, with the rear wheels disposed interiorly upon the swing arms, and high clearance of the stroller is maintained above any clearance as would otherwise occur were a rear axle used to unite the rear wheels, whereby each of the swing arms is independently securable at differing elevations relative one another and the frame adjustable all-terrain stroller apparatus is therefore usable along narrow, rocky, and sloped trails.

\* \* \* \* \*